US010880112B2

United States Patent
Immidi et al.

(10) Patent No.: US 10,880,112 B2
(45) Date of Patent: Dec. 29, 2020

(54) MULTICAST TRAFFIC IN A VIRTUAL EXTENSIBLE LOCAL AREA NETWORK (VXLAN)

(71) Applicant: Arista Networks, Inc., Santa Clara, CA (US)

(72) Inventors: Kiran Immidi, Fremont, CA (US); Santosh Kumar, Morgan Hill, CA (US); Kalyan Chakravarthy Nidumolu, Fremont, CA (US); Prashant Srinivas, San Jose, CA (US); Gaofeng Yue, San Jose, CA (US)

(73) Assignee: Arista Networks, Inc., Santa Clara, CA (US)

( * ) Notice: Subject to any disclaimer, the term of this patent is extended or adjusted under 35 U.S.C. 154(b) by 0 days.

(21) Appl. No.: 16/234,415

(22) Filed: Dec. 27, 2018

(65) Prior Publication Data

US 2019/0207779 A1 Jul. 4, 2019

Related U.S. Application Data

(60) Provisional application No. 62/612,624, filed on Dec. 31, 2017.

(51) Int. Cl.
| | |
|---|---|
| *H04L 12/18* | (2006.01) |
| *H04L 12/753* | (2013.01) |
| *H04L 12/721* | (2013.01) |
| *H04L 12/46* | (2006.01) |

(52) U.S. Cl.
CPC ........ *H04L 12/185* (2013.01); *H04L 12/4633* (2013.01); *H04L 12/4641* (2013.01); *H04L 45/12* (2013.01); *H04L 45/48* (2013.01)

(58) Field of Classification Search
None
See application file for complete search history.

(56) References Cited

U.S. PATENT DOCUMENTS

| | | | |
|---|---|---|---|
| 2011/0010441 A1* | 1/2011 | Gutierrez | H04L 12/1868 709/223 |
| 2016/0119156 A1* | 4/2016 | Drake | H04L 45/16 709/223 |
| 2017/0093689 A1* | 3/2017 | Manur | H04L 12/18 |
| 2017/0317919 A1* | 11/2017 | Fernando | H04L 12/4633 |
| 2019/0052598 A1* | 2/2019 | Hira | H04L 47/125 |

* cited by examiner

*Primary Examiner* — Rebecca E Song
(74) *Attorney, Agent, or Firm* — Haley Guiliano LLP; Richard M. Feustel, Jr.; Firasat Ali

(57) ABSTRACT

Multicast traffic in a virtual extensible local area network (VXLAN). In some embodiments, a method is provided. The method includes registering a network device as a virtual extensible local area network (VXLAN) tunnel endpoint (VTEP) of a VXLAN. The VXLAN includes an overlay network and the overlay network is implemented on an underlay network. The method also includes receiving multicast traffic from the multicast source. The method further includes transmitting the multicast traffic to one or more multicast receivers using the underlay network.

20 Claims, 6 Drawing Sheets

MULTICAST TRAFFIC IN A VIRTUAL EXTENSIBLE LOCAL AREA NETWORK (VXLAN)

CROSS-REFERENCE TO RELATED APPLICATIONS

This application claims the benefit of U.S. Provisional Patent Application No. 62/612,624, filed on Dec. 31, 2017. The disclosure of the above-referenced application is hereby incorporated by reference in its entirety.

BACKGROUND

Local area networks (LAN), which route network packets through network devices (e.g., switches, routers, cables, chips or integrated circuits, etc.), can be virtualized as virtual local area networks (VLAN) and extensible virtual local area networks (VXLAN). VXLAN uses encapsulation of network packets and establishes VXLAN tunnel (or tunneling) endpoints (VTEPs, also known as virtual tunneling endpoints).

SUMMARY

In some embodiments, a method is provided. The method includes registering a network device as a virtual extensible local area network (VXLAN) tunnel endpoint (VTEP) of a VXLAN. The VXLAN includes an overlay network and the overlay network is implemented on an underlay network. The method also includes receiving multicast traffic from the multicast source. The method further includes transmitting the multicast traffic to one or more multicast receivers using the underlay network.

In some embodiments, a method is provided. The method includes registering a network device as a virtual extensible local area network (VXLAN) tunnel endpoint (VTEP) of a VXLAN. The VXLAN comprises an overlay network and the overlay network is implemented on an underlay network. The method also includes transmitting a (S,G) join message to a rendezvous point. The method further includes receiving multicast traffic using the underlay network.

In some embodiments, a network device is provided. The network device includes a memory configured to store data and a processing device operatively coupled to the memory. The processing device is configured to register a network device as a virtual extensible local area network (VXLAN) tunnel endpoint (VTEP) of a VXLAN. The VXLAN comprises an overlay network and the overlay network is implemented on an underlay network. The processing device is also configured to receive multicast traffic from the multicast source. The processing device is further configured to transmit the multicast traffic to one or more multicast receivers using the underlay network.

Other aspects and advantages of the embodiments will become apparent from the following detailed description taken in conjunction with the accompanying drawings which illustrate, by way of example, the principles of the described embodiments.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

As discussed above, Local area networks (LAN), which route network packets through network devices (e.g., switches, routers, cables, chips or integrated circuits, etc.), can be virtualized as virtual local area networks (VLAN) and extensible virtual local area networks (VXLAN). VXLAN uses encapsulation of network packets and establishes VXLAN tunnel (or tunneling) endpoints (VTEPs, also known as virtual tunneling endpoints). Multicast traffic may be one type of traffic (e.g., data, packets, messages, frames, etc.) that are transmitted using a VXLAN. Multicast traffic may be traffic that is transmitted to a group of destination or receiving devices. For example, multicast traffic may be traffic that is addressed to a group address or a multicast address. The multicast address or group address may be a logical identifier for the group destination or receiving devices, which may be referred to as multicast receiver.

In general, traditional multicast routing techniques may be usable in networks that implement a VXLAN. For example, general protocol independent multicast (PIM) techniques may not be usable because one of the network devices in the network may be selected as the designated router (DR) which may prevent proper routing of multicast traffic. Networks that implement a VXLAN may transmit multicast traffic to every VTEP in the VXLAN to route the multicast packets to the multicast receivers which may cause unnecessary traffic on the network. In addition, when the multicast source is on the overlay network, the underlay network may not be aware of the route to reach the source in the underlay network because the operation of the overlay network is transparent to the operation of the underlay network. Thus, it is may be useful to allow multicast traffic to be communicated in a VXLAN by using the underlay network and/or without VXLAN encapsulation. It is within this context that the example, implementations, and embodiments disclosed herein arise.

Figure 1:
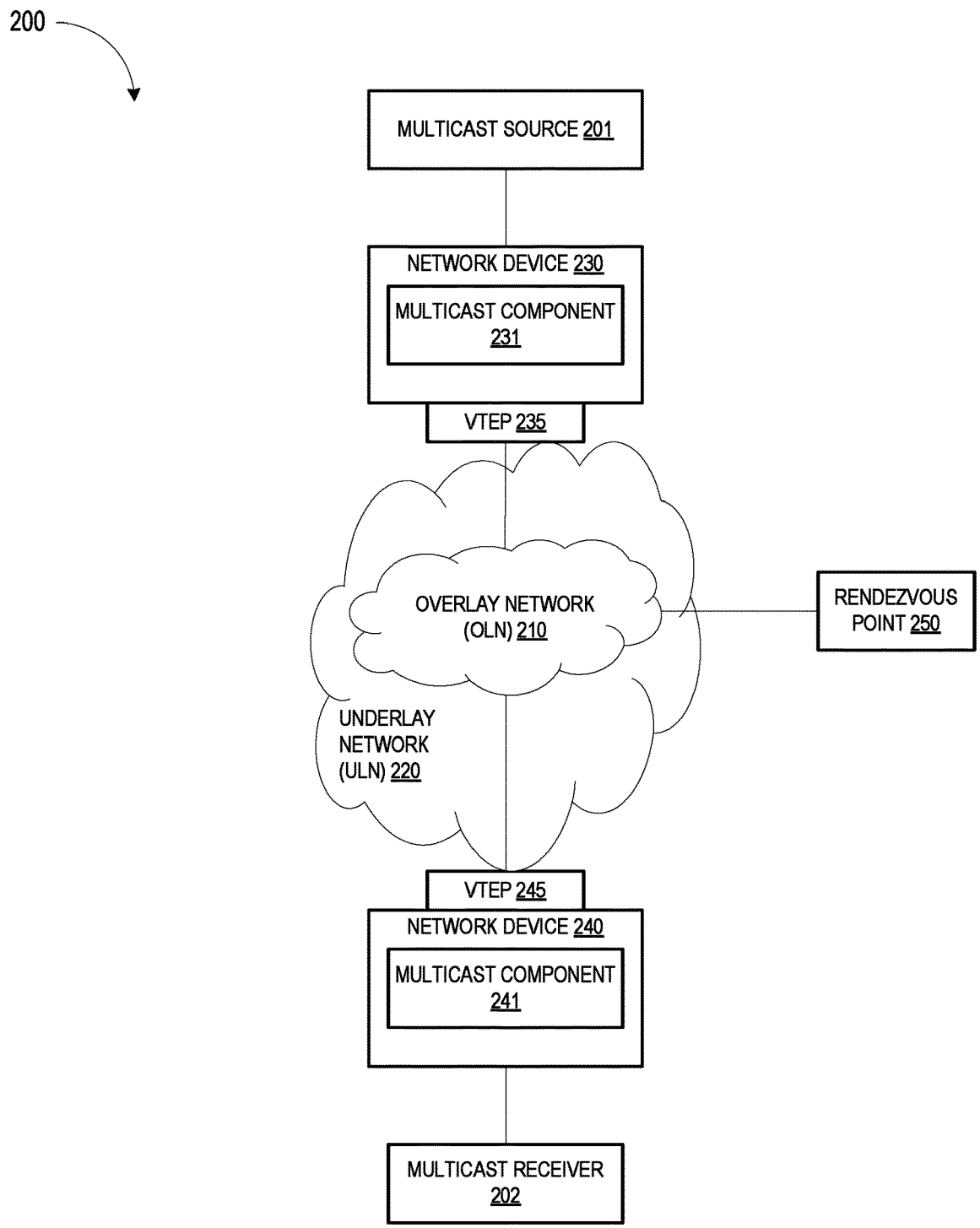
FIG. 1 is a network diagram showing a network architecture, in accordance with some embodiments of the present disclosure.

FIG. 1 is a network diagram showing a network architecture 200, in accordance with some embodiments of the present disclosure. In one embodiment, the network architecture 200 may implement a VXLAN. The network architecture 200 a multicast source 201, a multicast receiver 202, an overlay network (OLN) 210, an underlay network (ULN) 220, a network device 230, a network device 240, and a rendezvous point (RP) 250. The multicast source 201 may be a computing device (e.g., a desktop computer, a laptop computer, a tablet computer, a smartphone, a cellular phone, etc.) or a network device (e.g., a network switch, a network router, etc.) that transmits multicast traffic. As discussed above, multicast traffic may be traffic (e.g., data, packets, messages, frames, etc.) that is transmitted to a group of destination or receiving devices. For example, multicast traffic may be traffic that is addressed to a group address or a multicast address. The multicast address or group address may be a logical identifier for the group destination or receiving devices. The multicast source 201 may transmit multicast traffic to the devices that are identified by the group address or multicast address. The multicast receiver 202 may be a computing device or a network device that receives multicast traffic. For example, the multicast receiver 202 may be device that is identified by the group address or multicast address.

The overlay network 210 may be a virtual or logical network that built or implemented on top of an underlying network or underlying network infrastructure. For example, the overlay network 210 may be a virtual network that is built upon an underlying network infrastructure that may include switches, routers, bridges, gateways, and/or other types of network devices.

Each of the network devices 230 and 240 may be physical devices (such as network switches, network routers, network gateways, network bridges, etc.) or may be virtual devices (such as virtual machines executing on a hypervisor or a container executing on a container manager). Network device 230 includes a VTEP 235 and network device 240 includes a VTEP 245. A VTEP may be an endpoint for the VXLAN. Network device 230 includes a multicast component 231 and network device 240 includes a multicast component 241. In some embodiments, the multicast components 231 and 241 may allow the network devices 230 and 240 to communicate multicast traffic with each other without encapsulating the multicast traffic in VXLAN packets. The multicast components 231 and 241 may allow the network devices 230 and 240 may also allow the network devices 230 and 240 to communicate multicast traffic with each other using the underlay network 220 directly. For example, the multicast components 231 and 241 may allow the network devices 230 and 240 may also allow the network devices 230 and 240 to communicate multicast traffic with each other IP address or translated IP addresses of the underlay network 220. In some embodiments, the network devices 230 and 240 may each act as their own designated router (DR).

In one embodiment, the internet protocol (IP) address of the VTEP 235 and the VTEP 245 may be reachable in the underlay network 220. For example, the VTEP 235 may be able to reach the UP address of the VTEP 235 and vice versa. In another embodiment, the rendezvous point 250 may be configured for the group address or multicast by the multicast source 201. The rendezvous point 250 may also reachable in the underlay network 220 (e.g., the IP address of the rendezvous point 250 may be reachable in the underlay network 220). In one embodiment, the network devices 230 and 240 may not transmit Internet Group Management Protocol (IGMP), protocol independent multicast (PIM) traffic and non-link local multicast traffic that they receive via their respective ingress interfaces. For example, the network device 230 may drop PIM packets or messages that are received via an ingress interface. In another example, non-link local multicast traffic that has been encapsulated in VXLAN packets may be dropped by the network device 230.

In one embodiment, the network architecture 200 may use the PIM sparse mode (PIM-SM) routing protocol to route multicast traffic. When the PIM-SM routing protocol is used, the multicast source 201 may begin transmitting multicast traffic to the group address or multicast address (which identifies or includes the multicast receiver 202). The multicast traffic is received by the network device 230 and the multicast component 231 may add an (S,G) route to a routing table of the network device 230. The (S,G) route may include the VXLAN VLAN as an input interface (IIF) and may include a PIM-SM register interface as the output interface (OIF). The PIM register interface may allow the multicast source 201 to register with the rendezvous point 250. The multicast traffic may be included in PIM-SM packets which are unicast to the rendezvous point 250.

In one embodiment, an external device (e.g., a computing device, a network device, etc.) coupled to the network device 231 and the external device may install a host route (e.g., a /32 route) for the multicast source 201, into the routing table for the network device 230. In another embodiment, the IP address of the multicast source may be translated to a different IP address of the multicast traffic from the multicast source 201 may be encapsulated with an encapsulating protocol. For example, network address translation (NAT) may be used to map the IP address of the multicast source 201 to the IP address of the VTEP 230. The NAT may be performed on control pane and data plan traffic. When performing the NAT, a route (VTEP 230 IP, G) may be added to the routing table for the network device 230, where "VTEP 230 IP" is the IP address for the VTEP 230. In another example, general routing encapsulation (GRE) may be used to encapsulate the multicast traffic into GRE packets. The source IP for the GRE packet may be the IP address of the VTEP 230 and the destination IP address may be the multicast address or group address. In some embodiments, the multicast traffic is not encapsulated with VXLAN packets but is encapsulated using other encapsulation protocols (such as GRE). In one embodiment, the border gateway protocol (BGP) or interior gateway protocol (IGP) commands or messages may be used to advertise the VXLAN VLAN subnet.

In one embodiment, the rendezvous point 250 may send an (S,G) join message or request to the network device 230. The network device 230 may also be referred to as a first hop router (FHR) because the network device 230 may be the first network device (e.g., first router) that is coupled to the multicast source 201. The network device 230 may replace the PIM-SM register interface with the interface to the rendezvous point 250 (e.g., the network interface with the (S,G) join message was received from the rendezvous point 250) as the OIF and may start transmitting multicast traffic to the rendezvous point 250. For example, the network device 230 may unicast the multicast traffic to the rendezvous point 250.

In one embodiment, the network device 240 and/or multicast receiver 202 may start receiving multicast traffic (from the multicast source) via a shared tree or rendezvous point tree (RPT) of the rendezvous point 250. The network device 240 may add an (S,G) route that may be an extended or expanded entry of a (*,G) route. For example, the (S,G) route may inherit the input interface and output interface from the (*,G) route. The network device 240 may send a (S,G) join towards the network device 230. For example, the network device 240 may send an (S,G) join towards the network interface where the multicast traffic was received. The network device 230 may receive the (S,G) join from the network device 240 and may add the network interface (where the (S,G) join from the network device 240 was received) to the output interface for its (S,G) route. When the network device 240 begins to receive multicast traffic from the network device 230 via the shortest path tree (SPT) rather than the rendezvous point tree, the network device 240 may update the output interface of its (S,G) route with the network interface where the multicast cast traffic was received via the SPT. This may allow the multicast traffic to flow between the multicast source 201 and the multicast receiver 202 via the shortest path tree, rather than the rendezvous point tree.

In one embodiment, the network architecture 200 may use the PIM Source-Specific Multicast (PIM-SSM) routing protocol to route multicast traffic. The PIM-SSM routing protocol may be used when the multicast receiver 202 or network device 240, is aware of the IP address of the network device 230 or multicast source 201. When the PIM-SSM routing protocol is used, the multicast source 201 may begin transmitting multicast traffic. The network device 230 may receive the multi-cast traffic and may create an (S,G) route it its routing table, where the input interface is the VXLAN VLAN and where there are no output interfaces. As discussed above, an external device may install a host route for the multicast source 201, into the routing table for the network device 230. The network device 240 may send an IGMP version 3 (IGMPV3) join request or message on the VXLAN VLAN. The network device 240 may create an (S,G) route in its routing table with the input interface pointing to the network interface (e.g., the underlay network interface) that is directed towards the multicast source 201, and with the output interface as the VXLAN VLAN interface. The network device 240 may send an (S,G) join towards the network device 230. The network device 230 may receive the (S,G) join (from the network device 240) and may add the network interface (e.g., the underlay network interface) where the (S,G) join was received to its (S,G) route. This may allow the multicast traffic to flow between the multicast source 201 and the multicast receiver 202 via a shortest path tree.

Figure 2:
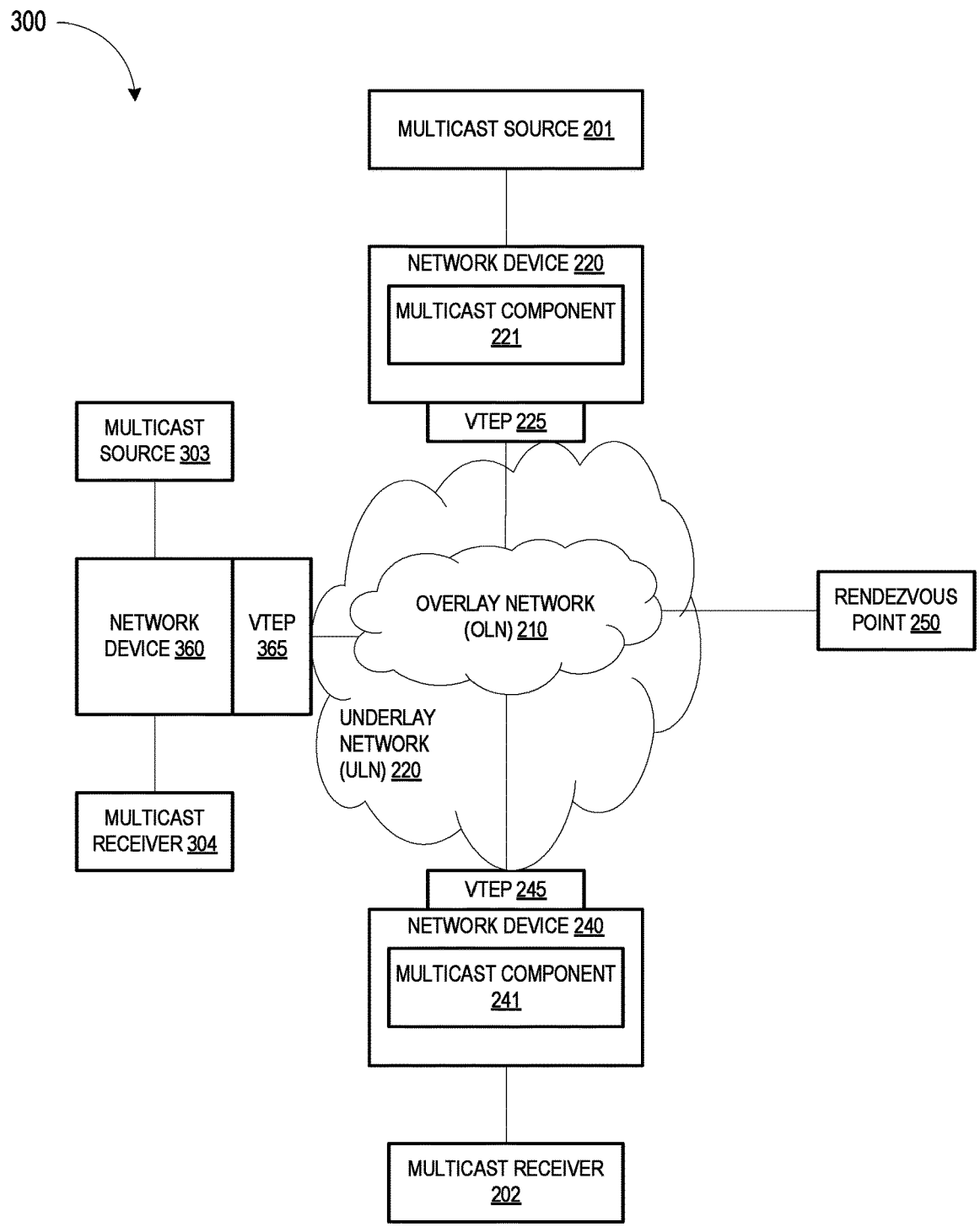
FIG. 2 is a network diagram showing a network architecture, in accordance with some embodiments of the present disclosure.

FIG. 2 is a network diagram showing a network architecture 300, in accordance with some embodiments of the present disclosure. In one embodiment, the network architecture 300 may implement a VXLAN. The network architecture 300 a multicast source 201, a multicast receiver 202, an overlay network (OLN) 210, an underlay network (ULN) 220, a network device 230, a network device 240, a rendezvous point (RP) 250, a multicast source 303, a multicast receiver 304, and a network device 360. The multicast sources 201 and 303 may be computing device s (e.g., a desktop computer, a laptop computer, a tablet computer, a smartphone, a cellular phone, etc.) or network devices (e.g., a network switch, a network router, etc.) that transmits multicast traffic. As discussed above, multicast traffic may be traffic (e.g., data, packets, messages, frames, etc.) that is transmitted to a group of destination or receiving devices. For example, multicast traffic may be traffic that is addressed to a group address or a multicast address. The multicast address or group address may be a logical identifier for the group destination or receiving devices. The multicast source 201 may transmit multicast traffic to the devices that are identified by the group address or multicast address. The multicast receivers 202 and 304 may be computing devices or network devices that receives multicast traffic. For example, the multicast receiver 302 may be device that is identified by the group address or multicast address.

The overlay network 210 may be a virtual or logical network that built or implemented on top of an underlying network or underlying network infrastructure. For example, the overlay network 210 may be a virtual network that is built upon an underlying network infrastructure that may include switches, routers, bridges, gateways, and/or other types of network devices.

Each of the network devices 230 and 240 may be physical devices (such as network switches, network routers, network gateways, network bridges, etc.) or may be virtual devices (such as virtual machines executing on a hypervisor or a container executing on a container manager). Network device 230 includes a VTEP 235 and network device 240 includes a VTEP 245. A VTEP may be an endpoint for the VXLAN. Network device 230 includes a multicast component 231 and network device 240 includes a multicast component 241. In some embodiments, the multicast components 231 and 241 may allow the network devices 230 and 240 to communicate multicast traffic with each other without encapsulating the multicast traffic in VXLAN packets. The multicast components 231 and 241 may allow the network devices 230 and 240 may also allow the network devices 230 and 240 to communicate multicast traffic with each other using the underlay network 220 directly. In some embodiments, the network devices 230 and 240 may each act as their own designated router (DR). As illustrated in FIG. 2, the network device 360 does not include a multicast component. This may indicate that the network device 360 may be an older or legacy device or may be manufactured by a different manufacturer than network devices 230 and 240.

In one embodiment, the internet protocol (IP) address of the VTEP 225 and the VTEP 245 may be reachable in the underlay network 220. For example, the VTEP 225 may be able to reach the UP address of the VTEP 225 and vice versa. In another embodiment, the rendezvous point 250 may be configured for the group address or multicast by the multicast source 201. The rendezvous point 250 may also reachable in the underlay network 220 (e.g., the IP address of the rendezvous point 250 may be reachable in the underlay network 220). In one embodiment, the network devices 230 and 240 may not transmit Internet Group Management Protocol (IGMP), protocol independent multicast (PIM) traffic and non-link local multicast traffic that they receive via their respective ingress interfaces. For example, the network device 230 may drop PIM packets or messages that are received via an ingress interface. In another example, non-link local multicast traffic that has been encapsulated in VXLAN packets may be dropped by the network device 230. In one embodiment, the VXLAN VLAN may be a layer-3 (L3) VLAN. For example, the VXLAN VLAN may have a switch virtual interface (SVI) with an IP address. In another embodiment, the VXLAN VLAN may be a layer-2 (L2) VLAN. For example, the VXLAN VLAN may have a switch virtual interface (SVI) with no IP address. For an L2 VLAN, the SVI may be used for routing multicast traffic and may not be used for unicast traffic.

In one embodiment, the network architecture 300 may use the PIM-SM routing protocol, the multicast source 201 may be transmitting multicast traffic, and the multicast receiver 304 may be receiving the multicast traffic. When the PIM-SM routing protocol is used, the multicast source 201 may begin transmitting multicast traffic to the group address or multicast address (which identifies or includes the multicast receiver 302). The multicast traffic is received by the network device 230 and the multicast component 221 may add an (S,G) route to a routing table of the network device 230. The (S,G) route may include the VXLAN VLAN as an input interface (IIF) and may include a PIM-SM register interface as the output interface (OIF). The PIM register interface may allow the multicast source 201 to register with the rendezvous point 250. The multicast traffic may be included in PIM-SM packets which are unicast to the rendezvous point 250.

In one embodiment, an external device (e.g., a computing device, a network device, etc.) coupled to the network device 221 and the external device may install a host route (e.g., a /22 route) for the multicast source 201, into the routing table for the network device 230. In another embodiment, the IP address of the multicast source may be translated to a different IP address of the multicast traffic from the multicast source 201 may be encapsulated with an encapsulating protocol. For example, network address translation (NAT) may be used to map the IP address of the multicast source 201 to the IP address of the VTEP 230. The NAT may be performed on control pane and data plan traffic. When performing the NAT, a route (VTEP 230 IP, G) may be added to the routing table for the network device 230, where "VTEP 230 IP" is the IP address for the VTEP 230. In another example, general routing encapsulation (GRE) may be used to encapsulate the multicast traffic into GRE packets. The source IP for the GRE packet may be the IP address of the VTEP 230 and the destination IP address may be the multicast address or group address. In some embodiments, the multicast traffic is not encapsulated with VXLAN packets but is encapsulated using other encapsulation protocols (such as GRE). In one embodiment, the border gateway protocol (BGP) or interior gateway protocol (IGP) commands or messages may be used to advertise the VXLAN VLAN subnet.

In one embodiment, the rendezvous point 250 may send an (S,G) join message or request to the network device 230. The network device 230 may also be referred to as a first hop router (FHR) because the network device 230 may be the first network device (e.g., first router) that is coupled to the multicast source 201. The network device 230 may replace the PIM-SM register interface with the interface to the rendezvous point 250 (e.g., the network interface with the (S,G) join message was received from the rendezvous point 250) as the OIF and may start transmitting multicast traffic to the rendezvous point 250. For example, the network device 230 may unicast the multicast traffic to the rendezvous point 250.

In one embodiment, the multicast receiver 304 may send an IGMP version 2 (IGMPV2) join request/message on the VXLAN VLAN. The IGMPV2 join may be transmitted to all VTEPs in the network architecture 300 (e.g., may be flooded or transmitted to VTEP 225, 245, and other VTEPs (not illustrated in FIG. 2) which are in the network architecture 300. As discussed above, some of the network devices may include a multicast component (which allows the network devices to communicate multicast traffic using the underlay network and/or without encapsulating the multicast traffic in VXLAN packets) and some of the network devices may not include a multicast component. Of the network devices that include a multicast component, one may be selected to serve as the designated router (DR) for the network devices that do not include a multicast component. For example, the network device 240 may be selected as a DR for the network devices that do not include a multicast component. All network devices that include a multicast component except the designated router may drop the IGMPV2 join request/message. For example, all network devices that include a multicast component may drop the IGMPV2 join request/message except the network device 240. The network device 240 may add the group/source information in the IGMPV2 join/request message to the routing table appropriate network interface.

In one embodiment, the network device 360 may send a (*,G) join request/message to the rendezvous point 250. The network device 240 may forward the (*,G) join to the rendezvous point 250 and may create a (*,G) route in its routing table. The output interface of the (*,G) route may be the VXLAN interface. A (*,G) route may also be created in a mapping table at the rendezvous point 250 (e.g., the rendezvous point 250 may create a (*,G) route in its own mapping table).

In one embodiment, the network device 230 and the network device 240 may perform the same operations, functions, actions, methods, etc., as discussed above in conjunction with the PIM-SM routing protocol. In another embodiment, because the network device 240 is a DR for the network devices that do not include a multicast component, the network device 240 may forward all multicast traffic that is received from the multicast source 201 to the network devices without the multicast component. For example, the network device 240 may look at the (*,G) route and may expand the output interface (which is set to the VXLAN interface) to include all network devices without the multicast component.

In one embodiment, the network architecture 300 may use the PIM-SSM routing protocol, the multicast source 201 may be transmitting multicast traffic, and the multicast receiver 304 may be receiving the multicast traffic. The multicast receiver 304 may send an IGMP version 3 (IGMPV3) join request/message on the VXLAN VLAN. The IGMPV3 join may be transmitted to all VTEPs (and their corresponding network devices) in the network architecture 300 (e.g., may be flooded or transmitted to VTEP 225, 245, and other VTEPs (not illustrated in FIG. 2) which are in the network architecture 300 (and to their corresponding network devices). As discussed above, one of the network devices that include a multicast component, such as network devices 240 may be selected to serve as the designated router (DR) for the network devices that do not include a multicast component. All network devices that include a multicast component except the designated router may drop the IGMPV3 join request/message. For example, all network devices that include a multicast component may drop the IGMPV2 join request/message except the network device 240. The network device 240 may add the group/source information in the IGMPV2 join/request message to the routing table appropriate network interface. The network device 240 may also create an (S,G) route with the input interface pointing towards the multicast source 201 (e.g., the input interface may be set as the multicast source 201) and the output interface set to the VXLAN interface.

In one embodiment, the multicast source 303 may transmit multicast traffic and the multicast receiver 202 may receive the multicast traffic. The network architecture 300 may use either the PIM-SM routing protocol or the PIM-SSM routing protocol. The multicast source 303 may transmit multicast traffic to all network devices and/or VTEPs in the network architecture 300. For example, the multicast source 303 may transmit multicast traffic to the network device 360 (and VTEP 365), the network device 230 (and VTEP 235), and the network device 240 (and VTEP 245). The multicast source 303 may perform head end replication (HER) on the multicast traffic and may transmit the multicast traffic to all network devices and/or VTEPs in the broadcast, unknown unicast, and multicast (BUM) list for the VXLAN network identifier (VNI) that identifies the VTEP 365. All of network devices which include a multicast component may drop the multicast traffic received from the multicast source 303 except the network device that is the DR for the network devices that do not include a multicast component. For example, the network device 230 may drop the multicast traffic received from the multicast source 303. The network device 240 may perform the actions, operations, functions, and methods as described above in conjunction with network device 230. For example, the network device 240 may perform operations as if a multicast transmitter was directly coupled to the network device 240 (similar to network device 230 and multicast source 201 as described above) because the network device 240 is the DR for all of the network devices that do not include a multicast component.

Figure 3:
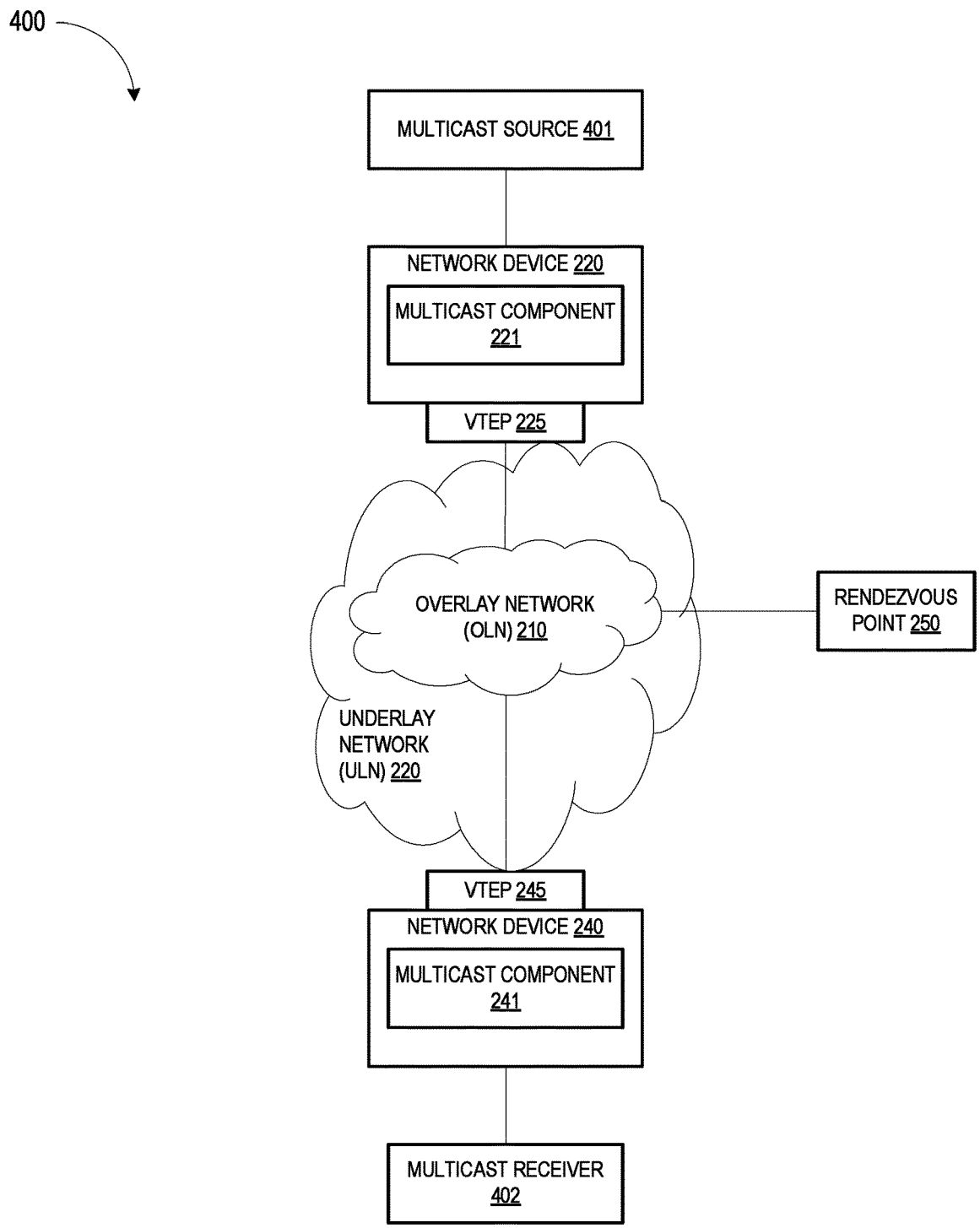
FIG. 3 is a network diagram showing a network architecture, in accordance with some embodiments of the present disclosure.

FIG. 3 is a network diagram showing a network architecture 400, in accordance with some embodiments of the present disclosure. In one embodiment, the network architecture 400 may implement a VXLAN. The network architecture 400 a multicast source 401, a multicast receiver 402, an overlay network (OLN) 210, an underlay network (ULN) 220, a network device 230, a network device 240, a rendezvous point (RP) 250, a multicast source 403, and a multicast receiver 404. The multicast sources 201 and 403 may be computing devices (e.g., a desktop computer, a laptop computer, a tablet computer, a smartphone, a cellular phone, etc.) or network devices (e.g., a network switch, a network router, etc.) that transmit multicast traffic. As discussed above, multicast traffic may be traffic (e.g., data, packets, messages, frames, etc.) that is transmitted to a group of destination or receiving devices. For example, multicast traffic may be traffic that is addressed to a group address or a multicast address. The multicast address or group address may be a logical identifier for the group destination or receiving devices. The multicast source 201 may transmit multicast traffic to the devices that are identified by the group address or multicast address. The multicast receivers 202 and 404 may be computing devices or network devices that receive multicast traffic. For example, the multicast receiver 302 may be device that is identified by the group address or multicast address.

The overlay network 210 may be a virtual or logical network that built or implemented on top of an underlying network or underlying network infrastructure. For example, the overlay network 210 may be a virtual network that is built upon an underlying network infrastructure that may include switches, routers, bridges, gateways, and/or other types of network devices.

Each of the network devices 230 and 240 may be physical devices (such as network switches, network routers, network gateways, network bridges, etc.) or may be virtual devices (such as virtual machines executing on a hypervisor or a container executing on a container manager). Network device 230 includes a VTEP 235 and network device 240 includes a VTEP 245. A VTEP may be an endpoint for the VXLAN. Network device 230 includes a multicast component 231 and network device 240 includes a multicast component 241. In some embodiments, the multicast components 231 and 241 may allow the network devices 230 and 240 to communicate multicast traffic with each other without encapsulating the multicast traffic in VXLAN packets. The multicast components 231 and 241 may allow the network devices 230 and 240 may also allow the network devices 230 and 240 to communicate multicast traffic with each other using the underlay network 220 directly.

In one embodiment, the network architecture 400 may implement virtual routing and forward (VRF) on the overlay network 210. This may also be referred to as implementing a VRF. In one embodiment, the overlay network 210 may implement a VRF and the underlay network 210 may also implement a VRF. The VRF implemented by the overlay network 210 may be referred to as an overlay VRF and the VRF implemented by the underlay network 220 may be referred to as the underlay VRF. A VRF may allow a network device to maintain separate routing tables and to use the separate routing tables simultaneously. For example, network device 230 may maintain/use multiple routing tables and network 240 may maintain/use multiple routing tables. Because the routing tables are independent, the same or overlapping IP addresses can be used in the different routing tables without conflicting with each other.

The multicast source 401 and the multicast receiver 402 may be part of the overlay VRF. Using one or more overlay VRFs in the network architecture 400 may cause issues when attempting to transmit multicast traffic using the underlay network 220 (e.g., transmitting the multicast traffic without using VXLAN encapsulation). In one embodiment, there may be possible conflicts between the source and group addresses used in the overlay network 210 and the source and group address used in the underlay network 220. The source IP address and multicast group address should be translated between the overlay network 210 and the underlay network 220. This translation may be stored in a translation table of network device 230, which may be a FHR. GRE encapsulation may be used on the network device 230 when transmitting multicast traffic to the underlay network 220. The source IP and the destination IP of the GRE packet may be obtained from the translation table. In the network device 230 (which may be the last hop router (LHR)), the packet may be decapsulated and the inner packet (e.g., the multicast traffic) may be forwarded in the overlay network 210. In one embodiment, the underlay network 220 may belong to the VRF in which the VXLAN interface is defined. For example, the underlay network 220 may belong to a default VRF. In addition, on the network device 210 (e.g., the FHR), traffic from the overlay network VRF may need to be provided to the underlay network VRF, and vice versa.

In one embodiment, the internet protocol (IP) address of the VTEP 225 and the VTEP 245 may be reachable in the underlay network 220. For example, the VTEP 225 may be able to reach the UP address of the VTEP 225 and vice versa. In another embodiment, the rendezvous point 250 may be configured for the group address or multicast by the multicast source 201. The rendezvous point 250 may also reachable in the underlay network 220 (e.g., the IP address of the rendezvous point 250 may be reachable in the underlay network 220). In one embodiment, the network devices 230 and 240 may not transmit Internet Group Management Protocol (IGMP), protocol independent multicast (PIM) traffic and non-link local multicast traffic that they receive via their respective ingress interfaces. For example, the network device 230 may drop PIM packets or messages that are received via an ingress interface. In another example, non-link local multicast traffic that has been encapsulated in VXLAN packets may be dropped by the network device 230.

In one embodiment, the mapping or translation of source and group addresses from the overlay VRF to the underlay VRF may be available to one or more of the network devices 230 and 240. For example, the network device 240 may store a mapping or translation table that indicates the mapping or translation of source and group addresses from the overlay VRF to the underlay VRF. The rendezvous point 250 may be also be configured to use the mapping or translation table. For example, the rendezvous point 250 may also have a copy of the mapping or translation table.

In one embodiment, the network switch 230 may encapsulate or perform network address translation on the multicast traffic received from the multicast source 401 for the control plane. For example, the multicast component 231 may encapsulate (S,G) multicast traffic into (S',G') multicast traffic, and may send the (S',G') traffic onto a virtual Ethernet interface in the overlay VRF, as discussed in more detail below. The multicast component 231 may also replicate the multicast traffic (without encapsulation or NAT) in the overlay VRF for the data plane.

In one embodiment, the network switch 240 may encapsulate or perform network address translation on IGMP traffic for the control plane. For example, the multicast component 241 convert the S (e.g., a source IP address) to S' (e.g., a translate IP address) and G (e.g., a group address) to G (e.g., a translated group address), as discussed in more detail below. The multicast component 241 may send the translated IGMP traffic onto a virtual Ethernet interface in the overlay network 210. The multicast component 241 may also replicate the encapsulated multicast traffic to the underlay output interface (in the underlay VRF) and the multicast traffic (without encapsulation) to the overlay output interface (in the overlay VRF).

In one embodiment, the network architecture 300 may use the PIM-SM routing protocol and may use an overlay VRF. The multicast receiver 402 may transmit an IGMP request, report, or message to become a member of the group address (or multicast address) which is received on the overlay VRF. The multicast component 241 may create a (*,G) route with the input interface as the interface to the rendezvous point 250 or a null input interface (e.g., Null0). The multicast component 241 may send a new IGMP report with G mapped to G (based on the translation or mapping table) and may transmit the packet to a virtual Ethernet interface pair, with a first virtual Ethernet interface of the pair in the overlay VRF and the second virtual Ethernet interface of the pair in the underlay VRF. The network component 241 may create a (*,G) route with the input interface pointing to the rendezvous point 250 and the output interface set as the second virtual Ethernet interface in the underlay VRF. This may allow the regular PIM-SM protocol to be used by the multicast component 241 to route multicast traffic in the underlay VRF. The multicast component 241 may also correlate the two routes (S',G') and (S,G) using the mapping table and may configure one route that combines the output interface of both routes. This may allow the multicast traffic (without encapsulation or NAT) to be replicated for the underlay output interface and the decapsulated traffic to be replicated in the overlay output interface.

In one embodiment, the multicast source 401 may start transmitting (S,G) traffic (e.g., multicast traffic) onto the overlay VRF. The multicast component 231 may receive the multicast traffic and create a (S,G) route with the input interface set as the VXLAN interface and tries to register with the rendezvous point 250. The multicast component 231 may also perform NAT or encapsulation operations to convert (S,G) traffic to (S',G') traffic. The encapsulated or translated traffic is over the virtual Ethernet interface pair, with a first virtual Ethernet interface of the pair in the overlay VRF and the second virtual Ethernet interface of the pair in the underlay VRF. The (S',G) traffic is received for the default VRF and a (S',G) route is added with the input interface set as the first virtual Ethernet interface. This may allow the regular PIM-SM protocol to be used by the multicast component 241 to route multicast traffic in the underlay VRF. The multicast component 231 may correlate the (S',G') route (in the underlay network 220) and (S,G) route (in the overlay network 210) using the mapping tables and may configure one route combining both of the output interfaces in the two routes. This may allow the multicast traffic (without encapsulation or NAT) to be replicated for the overlay output interface and the encapsulated packet to be replicated in the underlay output interface.

In one embodiment, the network device 240 (e.g., a LHR) may be begin receiving multicast traffic on a shared tree (e.g., an RPT). The network device 240 may create an (S',G) route as an expanded entry of a (*,G) route where the (S',G) route inherits the input interface and output interface from the (*,G) route. The network device 240 may transmit a (S',G') join towards the network device 230 (e.g., the FHR). Network device 230 may receive the (S',G) join and adds the network interface where the join was received to its output interface. When the network device 240 begins to receive multicast traffic from the network device 230 via the shortest path tree (SPT) rather than the rendezvous point tree, the network device 240 may update the output interface of its (S',G) route with the network interface where the multicast cast traffic was received via the SPT. This may allow the multicast traffic to flow between the multicast source 201 and the multicast receiver 202 via the shortest path tree, rather than the rendezvous point tree.

In one embodiment, the network architecture 300 may use the PIM-SSM routing protocol and may use an overlay VRF. The multicast receiver 402 may transmit an IGMP request, report, or message to become a member of the group address (or multicast address) which is received on the overlay VRF. The multicast component 241 may create a (S,G) route with the input interface as the interface to the IP address of the multicast source 401, the network device 230, or null input interface (e.g., Null0). The multicast component 241 may send a new IGMP report with (S,G) mapped to (S',G) (based on the translation or mapping table) and may transmit the packet to a virtual Ethernet interface pair, with a first virtual Ethernet interface of the pair in the overlay VRF and the second virtual Ethernet interface of the pair in the underlay VRF. The packet received on the second virtual Ethernet interface in the default VRF may be received by the multicast component 241 and a (S',G') route may be added with the input interface set to the translated IP address S' and the output interface set to the second virtual Ethernet interface.

In one embodiment, the network device 230 and/or the multicast component 231 may perform the same actions, operations, methods, functions, etc., as discussed above in conjunction with the PIM-SM routing protocol. In another embodiment, the network device 230 (e.g., the FHR) may receive an (S',G) join and may add the network interface (where the (S',G') join was received) as the output interface.

Figure 4:
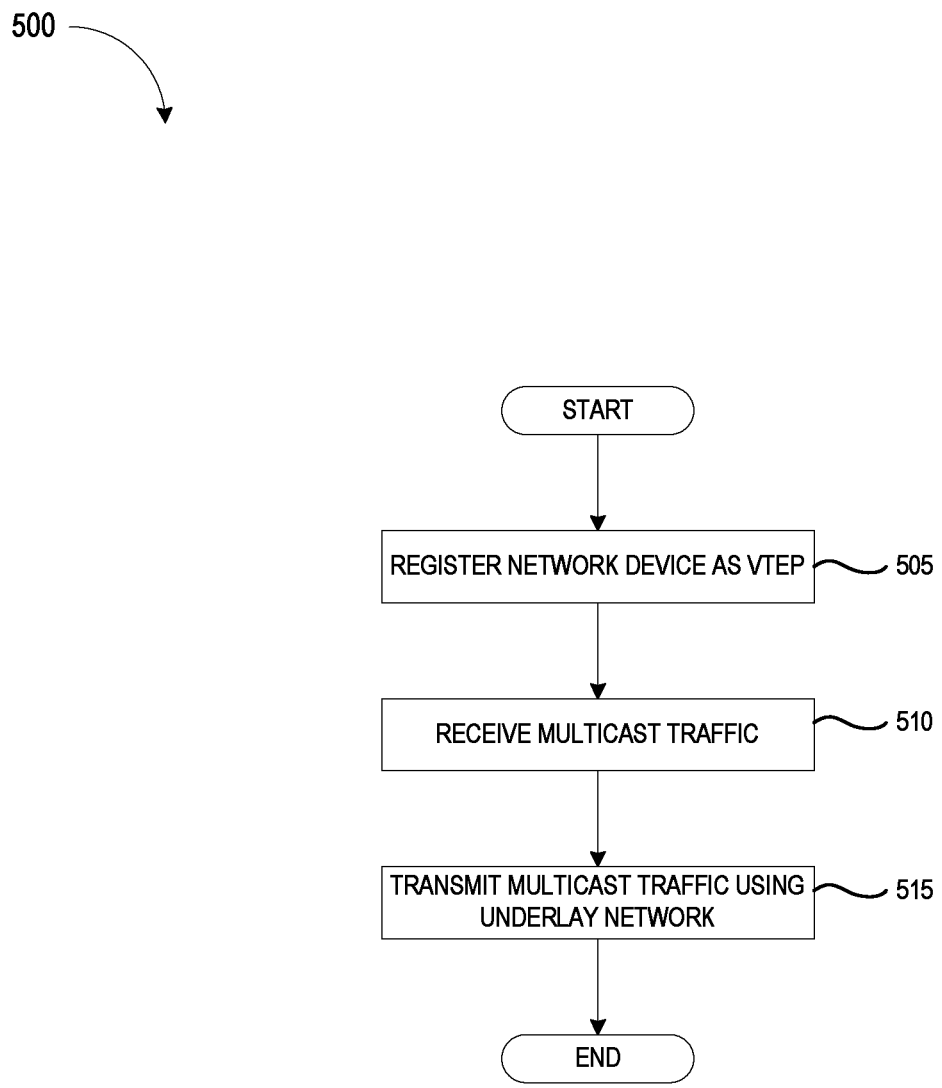
FIG. 4 is a flow diagram of a method for communicating multicast traffic, in accordance with some embodiments of the present disclosure.

FIG. 4 is a flow diagram of a method 500 for communicating multicast traffic, in accordance with some embodiments of the present disclosure. Method 500 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, the method 500 may be performed by a network device (e.g., network device 230), a multicast component (e.g., multicast component 231), and/or a processing device (e.g., a processing a central processing unit, a multi-core processor, an ASIC, an FPGA, etc.).

The method 500 begins at block 505 where the method 500 registers a network device as a VTEP of a VXLAN. For example, the network device may be configured as a VTEP for the VXLAN. As discussed above, the VXLAN may include an overlay network and the overlay network is implemented on an underlay network. At block 510, the method 500 receives multicast traffic from a multicast source. The method 500 transmits the multicast traffic to one or more multicast receivers using the underlay network at block 515, as discussed above in conjunction with FIGS. 1-3.

Figure 5:
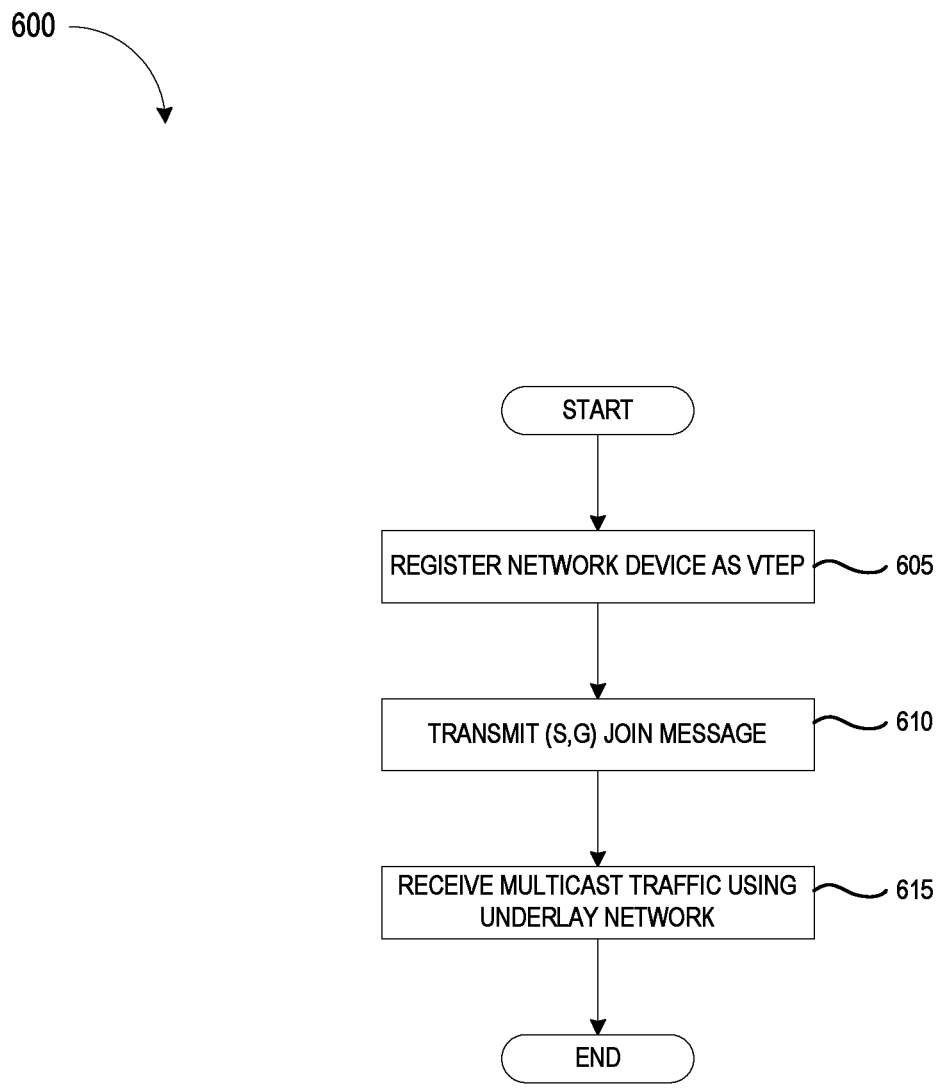
FIG. 5 is a flow diagram of a method for communicating multicast traffic, in accordance with some embodiments of the present disclosure.

FIG. 5 is a flow diagram of a method 600 for communicating multicast traffic, in accordance with some embodiments of the present disclosure. Method 600 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, the method 600 may be performed by a network device (e.g., network device 240), a multicast component (e.g., multicast component 241), and/or a processing device (e.g., a processing a central processing unit, a multi-core processor, an ASIC, an FPGA, etc.).

The method 600 begins at block 605 where the method 500 registers a network device as a VTEP of a VXLAN. For example, the network device may be configured as a VTEP for the VXLAN. As discussed above, the VXLAN may include an overlay network and the overlay network is implemented on an underlay network. At block 610, the method 600 transmitting a (S,G) join message to a rendezvous point, as discussed above in conjunction with FIGS. 1-3. The method 600 receives the multicast traffic from a multicast source using the underlay network at block 615, as discussed above in conjunction with FIGS. 1-3.

Figure 6:
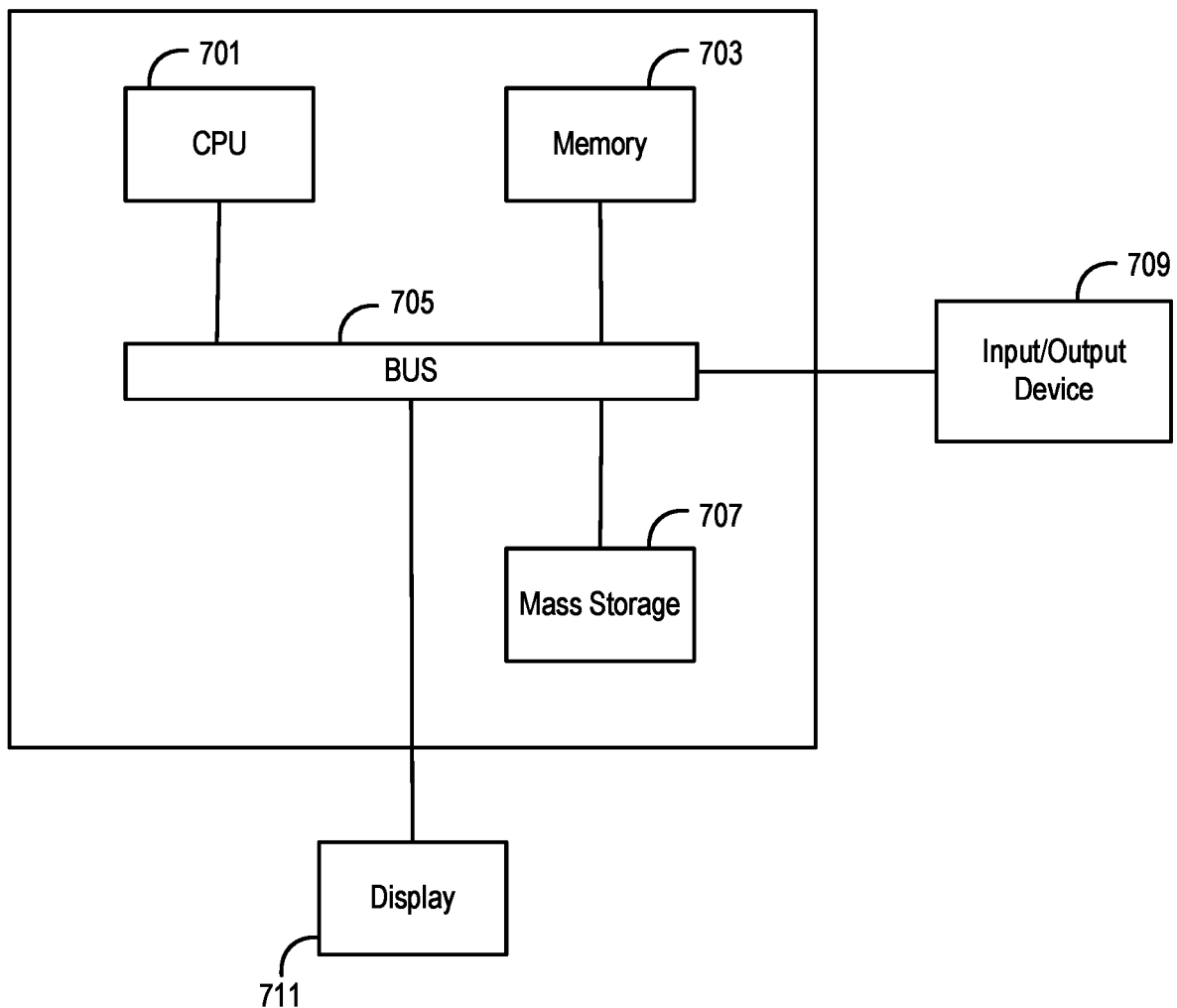
FIG. 6 is an illustration showing an exemplary computing device which may implement the embodiments described herein.

FIG. 6 is an illustration showing an exemplary computing device which may implement the embodiments described herein. The computing device of FIG. 7 may be used to perform embodiments of the functionality for consistent hashing and routing of network packets in accordance with some embodiments. The computing device includes a central processing unit (CPU) 701 (e.g., one or more processing devices, one or more processors, etc.), which is coupled through a bus 705 to a memory 703, and mass storage device 707. Mass storage device 707 represents a persistent data storage device such as a floppy disc drive or a fixed disc drive, which may be local or remote in some embodiments. The mass storage device 707 could implement a backup storage, in some embodiments. Memory 703 may include read only memory, random access memory, etc. Applications resident on the computing device may be stored on or accessed via a computer readable medium such as memory 703 or mass storage device 707 in some embodiments. Applications may also be in the form of modulated electronic signals modulated accessed via a network modem or other network interface of the computing device. It should be appreciated that CPU 701 may be embodied in a general-purpose processor, a special purpose processor, or a specially programmed logic device in some embodiments.

Display 711 is in communication with CPU 701, memory 703, and mass storage device 707, through bus 705. Display 711 is configured to display any visualization tools or reports associated with the system described herein. Input/output device 709 is coupled to bus 705 in order to communicate information in command selections to CPU 701. It should be appreciated that data to and from external devices may be communicated through the input/output device 709. CPU 701 can be defined to execute the functionality described herein to enable the functionality described with reference to FIGS. 1-6. The code embodying this functionality may be stored within memory 703 or mass storage device 707 for execution by a processor such as CPU 701 in some embodiments. The operating system on the computing device may be iOS™, MS-WINDOWS™, OS/2™, UNIX™, LINUX™, or other known/appropriate operating systems. It should be appreciated that the embodiments described herein may also be integrated with a virtualized computing system implemented with physical computing resources. Detailed illustrative embodiments are disclosed herein. However, specific functional details disclosed herein are merely representative for purposes of describing embodiments. Embodiments may, however, be embodied in many alternate forms and should not be construed as limited to only the embodiments set forth herein.

It should be understood that although the terms first, second, etc. may be used herein to describe various steps or calculations, these steps or calculations should not be limited by these terms. These terms are only used to distinguish one step or calculation from another. For example, a first calculation could be termed a second calculation, and, similarly, a second step could be termed a first step, without departing from the scope of this disclosure. As used herein, the term "and/or" and the "/" symbol includes any and all combinations of one or more of the associated listed items.

As used herein, the singular forms "a", "an" and "the" are intended to include the plural forms as well, unless the context clearly indicates otherwise. In addition, the term "set" includes a set with one or more items and/or elements within the set. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

With the above embodiments in mind, it should be understood that the embodiments might employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing. Any of the operations described herein that form part of the embodiments are useful machine operations. The embodiments also relate to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

A module, an application, a layer, an agent or other method-operable entity could be implemented as hardware, firmware, or a processor executing software, or combinations thereof. It should be appreciated that, where a software-based embodiment is disclosed herein, the software can be embodied in a physical machine such as a controller. For example, a controller could include a first module and a second module. A controller could be configured to perform various actions, e.g., of a method, an application, a layer or an agent.

The embodiments can also be embodied as computer readable code on a tangible non-transitory computer readable medium. The computer readable medium is any data storage device that can store data, which can be thereafter read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer system so that the computer readable code is stored and executed in a distributed fashion. Embodiments described herein may be practiced with various computer system configurations including hand-held devices, tablets, microprocessor systems, microprocessor-based or programmable consumer electronics, minicomputers, mainframe computers and the like. The embodiments can also be practiced in distributed computing environments where tasks are performed by remote processing devices that are linked through a wire-based or wireless network.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

It should be appreciated that the methods described herein may be performed with a digital processing system, such as a conventional, general-purpose computer system. Special purpose computers, which are designed or programmed to perform only one function may be used in the alternative.

In various embodiments, one or more portions of the methods and mechanisms described herein may form part of a cloud-computing environment. In such embodiments, resources may be provided over the Internet as services according to one or more various models. Such models may include Infrastructure as a Service (IaaS), Platform as a Service (PaaS), and Software as a Service (SaaS). In IaaS, computer infrastructure is delivered as a service. In such a case, the computing equipment is generally owned and operated by the service provider. In the PaaS model, software tools and underlying equipment used by developers to develop software solutions may be provided as a service and hosted by the service provider. SaaS typically includes a service provider licensing software as a service on demand. The service provider may host the software, or may deploy the software to a customer for a given period of time. Numerous combinations of the above models are possible and are contemplated.

Various units, circuits, or other components may be described or claimed as "configured to" perform a task or tasks. In such contexts, the phrase "configured to" is used to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. 112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method, comprising:
registering a network device as a virtual extensible local area network (VXLAN) tunnel endpoint (VTEP) of a VXLAN, wherein the VXLAN comprises an overlay network and wherein the overlay network is implemented on an underlay network;
receiving multicast traffic from the multicast source, wherein the multicast source is on the overlay network;
translating overlay IP address of the multicast source to an underlay IP address such that the multicast source is discoverable in the underlay network; and
transmitting the multicast traffic to one or more intended multicast receivers using the underlay network.

2. The method of claim 1, wherein transmitting the multicast traffic comprises:
transmitting the multicast traffic to a rendezvous point.

3. The method of claim 2, wherein transmitting the multicast traffic further comprises:
receiving a (S,G) join message from the rendezvous point;
adding a network interface where the multicast join message was received from the rendezvous point, as an output interface for a (S,G) route.

4. The method of claim 3, wherein transmitting the multicast traffic further comprises:
transmitting the multicast traffic to the one or more multicast receivers using a shared tree.

5. The method of claim 4, wherein transmitting the multicast further traffic comprises: receiving a second multicast join request from a multicast receiver.

6. The method of claim 5, wherein transmitting the multicast traffic further comprises:
updating the output interface for the (S,G) route to the network interface where the second multicast join request from a multicast receiver.

7. The method of claim 6, wherein transmitting the multicast further traffic comprises:

transmitting the multicast traffic to the one or more multicast receivers using a shortest path tree.

8. The method of claim 1, wherein the multicast traffic is not encapsulated in VXLAN packets.

9. A method, comprising:
registering a network device as a virtual extensible local area network (VXLAN) tunnel endpoint (VTEP) of a VXLAN, wherein the VXLAN comprises an overlay network and wherein the overlay network is implemented on an underlay network;
transmitting a (S,G) join message to a rendezvous point, wherein the rendezvous point is on the overlay network;
translating overlay IP address of the rendezvous point to an underlay IP address such that the rendezvous point is discoverable in the underlay network; and
receiving, by one or more receivers that transmitted a (S,G) join message, multicast traffic using the underlay network.

10. The method of claim 9, wherein receiving the multicast traffic comprises:
receiving the multicast traffic using a shared tree.

11. The method of claim 10, further comprising;
receiving the multicast traffic on a network interface of the network device;
updating an input interface of a (S,G) route to indicate the network interface.

12. The method of claim 11, wherein the multicast traffic is not encapsulated in VXLAN packets.

13. A network device, comprising:
a memory configured to store data;
a central processing unit device operatively coupled to the memory, the central processing unit device configured to:
register a network device as a virtual extensible local area network (VXLAN) tunnel endpoint (VTEP) of a VXLAN, wherein the VXLAN comprises an overlay network and wherein the overlay network is implemented on an underlay network;
receive multicast traffic from the multicast source, wherein the multicast source is on the overlay network;
translate overlay IP address of the multicast source to an underlay IP address such that the multicast source is discoverable in the underlay network; and
transmit the multicast traffic to one or more intended multicast receivers using the underlay network.

14. The network device of claim 13, wherein to transmit the multicast traffic, the central processing unit device is to:
transmit the multicast traffic to a rendezvous point.

15. The network device of claim 14, wherein to transmit the multicast traffic, the central processing unit device is further to:
receive a (S,G) join message from the rendezvous point;
add a network interface where the multicast join message was received from the rendezvous point, as an output interface for a (S,G) route.

16. The network device of claim 15, wherein to transmit the multicast traffic, the central processing unit device is further to:
transmit the multicast traffic to the one or more multicast receivers using a shared tree.

17. The network device of claim 16, wherein to transmit the multicast traffic, the central processing unit device is further to:
receive a second multicast join request from a multicast receiver.

18. The network device of claim 17, wherein to transmit the multicast traffic, the central processing unit device is further to:
update the output interface for the (S,G) route to the network interface where the second multicast join request from a multicast receiver.

19. The network device of claim 18, wherein to transmit the multicast traffic, the central processing unit device is further to:
transmit the multicast traffic to the one or more multicast receivers using a shortest path tree.

20. The network device of claim 13, wherein the multicast traffic is not encapsulated in VXLAN packets.

* * * * *